United States Patent
Holloway, Jr.

(10) Patent No.: US 6,412,426 B1
(45) Date of Patent: Jul. 2, 2002

(54) EQUIPMENT SUPPORT ASSEMBLY

(76) Inventor: Elijah Holloway, Jr., 8708 Lake Wheeler Rd., Raleigh, NC (US) 27603

( * ) Notice: Subject to any disclaimer, the term of this patent is extended or adjusted under 35 U.S.C. 154(b) by 0 days.

(21) Appl. No.: 09/765,473

(22) Filed: Jan. 22, 2001

(51) Int. Cl.[7] .............................................. A42B 73/00
(52) U.S. Cl. ...................................................... 108/44
(58) Field of Search ........................... 108/44, 45, 150; 248/158, 235, 240

(56) References Cited

U.S. PATENT DOCUMENTS

| 926,426 | A | * | 6/1909 | Koch |
| 2,616,622 | A | | 11/1952 | Miller |
| 3,589,577 | A | | 6/1971 | Basinger |
| 3,592,144 | A | | 7/1971 | Futrell |
| 3,750,597 | A | * | 8/1973 | Muns ........................... 108/45 |
| 3,964,612 | A | | 6/1976 | Skilliter et al. |
| 4,086,859 | A | * | 5/1978 | Dondero ..................... 108/44 X |
| 4,672,898 | A | * | 6/1987 | Davidson .................. 108/44 X |
| D320,980 | S | | 10/1991 | Howard et al. |
| 5,246,240 | A | * | 9/1993 | Romich et al. ............ 108/44 X |
| 5,485,793 | A | * | 1/1996 | Crowell ........................ 108/44 |
| 5,615,620 | A | * | 4/1997 | Qwen .......................... 108/45 |
| 5,673,628 | A | | 10/1997 | Boos |
| 5,769,369 | A | * | 6/1998 | Meinel ..................... 108/45 X |
| 6,315,252 | B1 | * | 11/2001 | Schultz ..................... 108/45 X |

* cited by examiner

Primary Examiner—Jose V. Chen

(57) ABSTRACT

A equipment support assembly for mounting equipment within a vehicle. The equipment support assembly includes an elongated member having a top end and a bottom end. A base plate has top side and bottom side. The base plate has a plurality of openings extending therethrough. The bottom side of the base plate is removably securable to a vehicle floor. The bottom end of the elongated member is integrally coupled to the top side of the base plate such that the elongated member is orientated generally vertical when the base plate is secured to the vehicle floor. A first mounting plate is integrally coupled to the top end of the elongated member. The first mounting plate is orientated generally horizontal. The first mounting plate has a plurality of openings extending therethrough. A second mounting plate is integrally coupled to the elongated member. The second mounting plate is positioned generally between the first mounting plate and the base plate. The second mounting plate is orientated generally horizontal and has a plurality of openings extending therethrough.

13 Claims, 2 Drawing Sheets

EQUIPMENT SUPPORT ASSEMBLY

BACKGROUND OF THE INVENTION

1. Field of the Invention

The present invention relates to equipment mountings and more particularly pertains to a new equipment support assembly for mounting equipment within a vehicle.

2. Description of the Prior Art

The use of equipment mountings is known in the prior art. More specifically, equipment mountings heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,964,612; 3,589,577; 2,616,622; U.S. Des. Pat. No. 320,980; U.S. Pat. Nos. 5,673,628; and 3,592,144.

While these devices fulfill their respective, particular objectives and requirements, the aforementioned patents do not disclose a new equipment support assembly. The inventive device includes an elongated member having a top end and a bottom end. A base plate has top side and bottom side. The base plate has a plurality of openings extending therethrough. The bottom side of the base plate is removably securable to a vehicle floor. The bottom end of the elongated member is integrally coupled to the top side of the base plate such that the elongated member is orientated generally vertical when the base plate is secured to the vehicle floor. A first mounting plate is integrally coupled to the top end of the elongated member. The first mounting plate is orientated generally horizontal. The first mounting plate has a plurality of openings extending therethrough. A second mounting plate is integrally coupled to the elongated member. The second mounting plate is positioned generally between the first mounting plate and the base plate. The second mounting plate is orientated generally horizontal and has a plurality of openings extending therethrough.

In these respects, the equipment support assembly according to the present invention substantially departs from the conventional concepts and designs of the prior art, and in so doing provides an apparatus primarily developed for the purpose of mounting equipment within a vehicle.

SUMMARY OF THE INVENTION

In view of the foregoing disadvantages inherent in the known types of equipment mountings now present in the prior art, the present invention provides a new equipment support assembly construction wherein the same can be utilized for mounting equipment within a vehicle.

The general purpose of the present invention, which will be described subsequently in greater detail, is to provide a new equipment support assembly apparatus and method which has many of the advantages of the equipment mountings mentioned heretofore and many novel features that result in a new equipment support assembly which is not anticipated, rendered obvious, suggested, or even implied by any of the prior art equipment mountings, either alone or in any combination thereof.

To attain this, the present invention generally comprises an elongated member having a top end and a bottom end. A base plate has top side and bottom side. The base plate has a plurality of openings extending therethrough. The bottom side of the base plate is removably securable to a vehicle floor. The bottom end of the elongated member is integrally coupled to the top side of the base plate such that the elongated member is orientated generally vertical when the base plate is secured to the vehicle floor. A first mounting plate is integrally coupled to the top end of the elongated member. The first mounting plate is orientated generally horizontal. The first mounting plate has a plurality of openings extending therethrough. A second mounting plate is integrally coupled to the elongated member. The second mounting plate is positioned generally between the first mounting plate and the base plate. The second mounting plate is orientated generally horizontal and has a plurality of openings extending therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new equipment support assembly apparatus and method which has many of the advantages of the equipment mountings mentioned heretofore and many novel features that result in a new equipment support assembly which is not anticipated, rendered obvious, suggested, or even implied by any of the prior art equipment mountings, either alone or in any combination thereof.

It is another object of the present invention to provide a new equipment support assembly which may be easily and efficiently manufactured and marketed.

It is a further object of the present invention to provide a new equipment support assembly which is of a durable and reliable construction.

An even further object of the present invention is to provide a new equipment support assembly which is susceptible of a low cost of manufacture with regard to both materials and labor, and which accordingly is then susceptible of low prices of sale to the consuming public, thereby making such equipment support assembly economically available to the buying public.

Still yet another object of the present invention is to provide a new equipment support assembly which provides in the apparatuses and methods of the prior art some of the advantages thereof, while simultaneously overcoming some of the disadvantages normally associated therewith.

Still another object of the present invention is to provide a new equipment support assembly for mounting equipment within a vehicle.

Yet another object of the present invention is to provide a new equipment support assembly which includes an elongated member having a top end and a bottom end. A base plate has top side and bottom side. The base plate has a plurality of openings extending therethrough. The bottom side of the base plate is removably securable to a vehicle floor. The bottom end of the elongated member is integrally coupled to the top side of the base plate such that the elongated member is orientated generally vertical when the base plate is secured to the vehicle floor. A first mounting plate is integrally coupled to the top end of the elongated member. The first mounting plate is orientated generally horizontal. The first mounting plate has a plurality of openings extending therethrough. A second mounting plate is integrally coupled to the elongated member. The second mounting plate is positioned generally between the first mounting plate and the base plate. The second mounting plate is orientated generally horizontal and has a plurality of openings extending therethrough.

Still yet another object of the present invention is to provide a new equipment support assembly that is retrofittable to existing vehicles.

Even still another object of the present invention is to provide a new equipment support assembly that allows the user to customize usage of equipment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
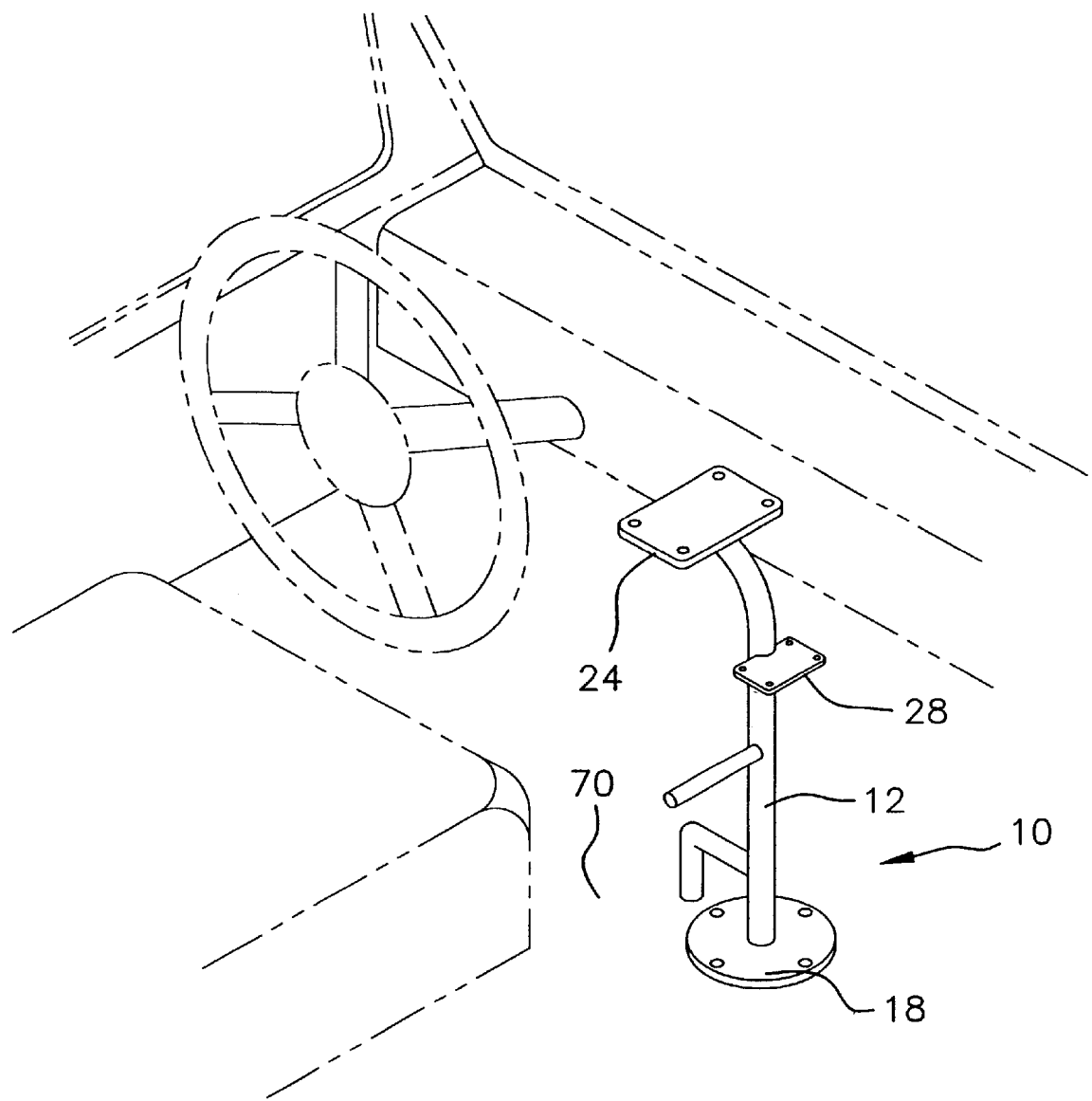
FIG. 1 is a schematic perspective environment view of a new equipment support assembly according to the present invention.
Figure 2:
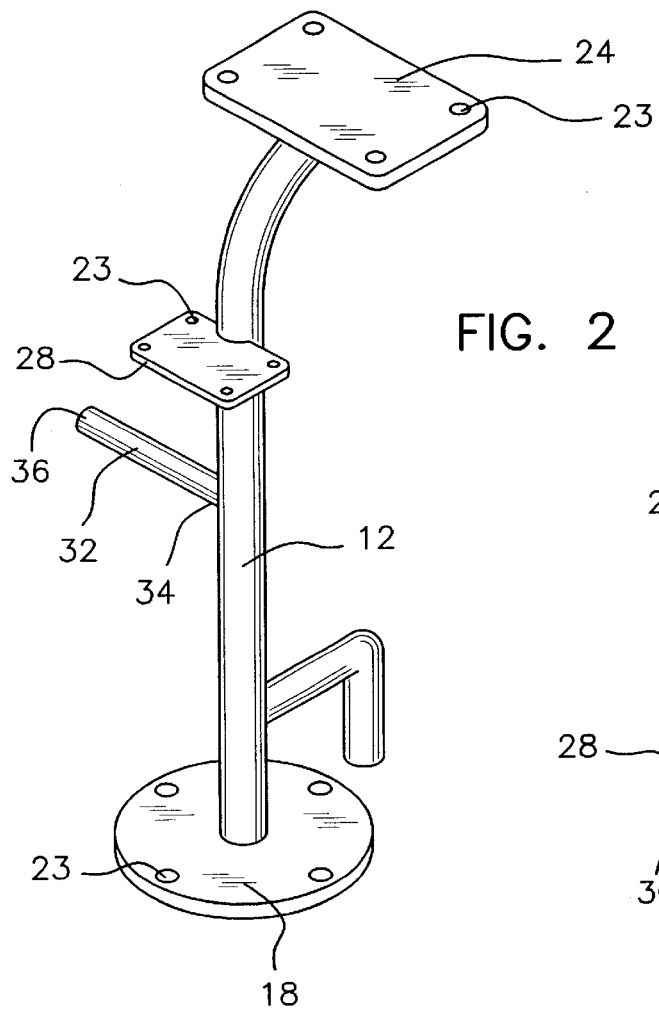
FIG. 2 is a schematic perspective view of the present invention.
Figure 3:
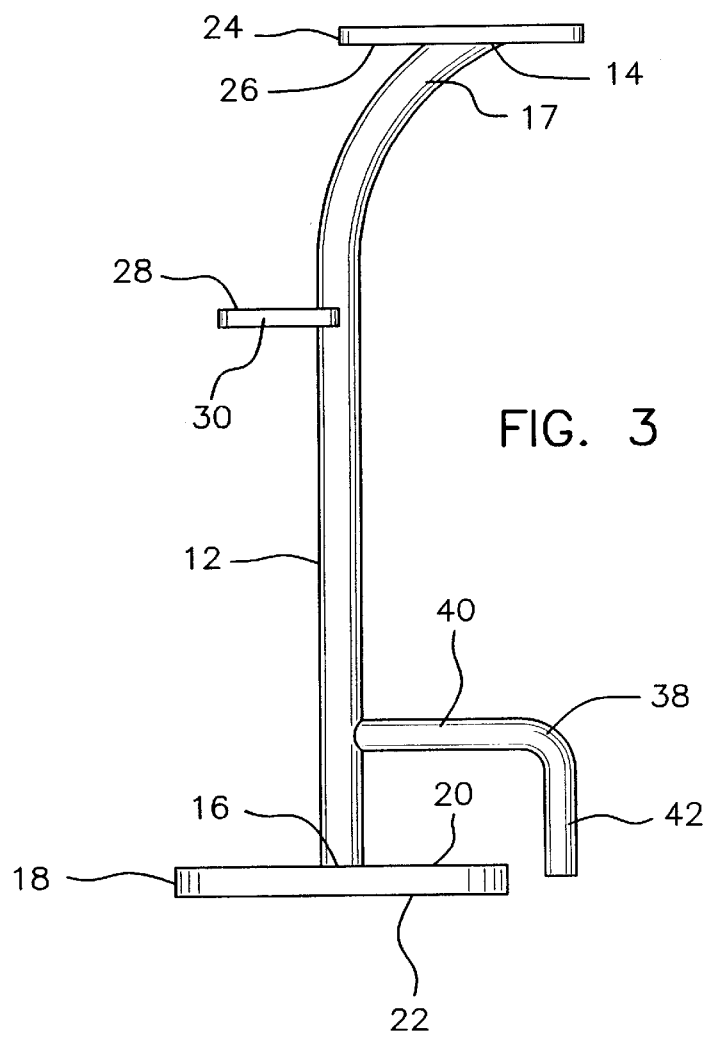
FIG. 3 is a schematic side view of the present invention.

With reference now to the drawings, and in particular to FIGS. 1 through 3 thereof, a new equipment support assembly embodying the principles and concepts of the present invention and generally designated by the reference numeral 10 will be described.

As best illustrated in FIGS. 1 through 3, the equipment support assembly 10 generally comprises is an assembly which is removably securable to a floor 70 of a vehicle. The assembly 10 comprises an elongated member 12 having a top end 14 and a bottom end 16. The elongated member 12 has an arcuate portion 17 positioned proximal to the top end 14. The elongated member 12 has a distance from the bottom end 16 to the top end 14 preferably between 2 feet and 4 feet.

A base plate 18 has top side 20 and bottom side 22. The base plate 18 has a plurality of openings 23 extending therethrough. The bottom side 22 of the base plate 18 is removably securable to the vehicle floor 70. The bottom end 16 of the elongated member 12 is integrally coupled to the top side 20 of the base plate 18 such that the elongated member 12 is orientated generally vertical when the base plate 18 is secured to the vehicle floor 70.

A first mounting plate 24 has a bottom side 26 integrally coupled to the top end 14 of the elongated member 12. The first mounting plate 24 is orientated generally horizontal. The first mounting plate 24 has a generally rectangular shape and has a plurality of openings 23 extending therethrough.

A second mounting plate 28 has a peripheral edge 30 integrally coupled to the elongated member 12 and is positioned generally adjacent to the arcuate portion 17. The second mounting plate 28 extends away from the arcuate portion 17. The second mounting plate 28 is orientated generally horizontal. The second mounting plate 28 has a generally rectangular shape and has a plurality of openings 23 extending therethrough.

A rod 32 has a first end 34 and second end 36. The first end 34 of the rod is integrally coupled to the elongated member 12 such that the rod extends 32 outwardly away from the elongated member in a generally horizontal orientation. The rod 32 is positioned generally between the base plate 18 and the second mounting plate 28. The rod 32 is orientated generally perpendicular to a plane extending through a length of the elongated member 12.

A bracket 38 has a leg portion 40 and a foot portion 42 integrally coupled together such that the bracket 38 generally has an L-shape. The leg portion 40 has a free end integrally coupled to the elongated member 12 such that the leg portion 40 extends outwardly away from the elongated member 12 in a generally horizontal orientation and the foot portion 42 extends downward. The bracket 38 is positioned generally between the rod 32 and the base plate 18. The plane generally extends through the leg 40 and foot 42 portions.

In use, the base plate 18 is positioned on the vehicle floor 70 and conventional fasteners are extended through the openings 23 in the base plate 18 and into the floor to hold it in place. Various instruments such as meters, speakers, microphones, radios and additional mountings may be coupled to the first plate, second plate, rod and bracket. The openings 23 in the plates allow for coupling any desired device to the assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An equipment support assembly for mounting equipment in a vehicle, said assembly being removably securable to a floor of a vehicle, said assembly comprising:
   an elongated member having a top end and a bottom end;
   a base plate having top side and bottom side, said base plate having a plurality of openings extending therethrough, said bottom side of said base plate being removably securable to the vehicle floor, said bottom end of said elongated member being integrally coupled to said top side of said base plate such that said elongated member is orientated generally vertical when said base plate is secured to said vehicle floor;
   a first mounting plate being integrally coupled to said top end of said elongated member, said first mounting plate being orientated generally horizontal, said first mounting plate having a plurality of openings extending therethrough;
   a second mounting plate being integrally coupled to said elongated member, said second mounting plate being positioned generally between said first mounting plate and said base plate, said second mounting plate being orientated generally horizontal, said second mounting plate having a plurality of openings extending therethrough; and
   a rod having a first end and second end, said first end of said rod being integrally coupled to said elongated member such that said rod extends outwardly away from said elongated member in a generally horizontal orientation, said rod being positioned generally between said base plate and said second mounting plate.

2. The equipment support assembly as in claim 1, wherein said elongated member has a curved portion positioned proximal to said top end, said second mounting plate being positioned generally adjacent to said curved portion and extending away from said curved portion.

3. The equipment support assembly as in claim 2, further including a support being integrally coupled to said elongated member and positioned generally adjacent to said base plate.

4. The equipment support assembly as in claim 3, said support has a leg portion and foot portion integrally coupled together such that said support generally has an L-shape, said leg portion having a free end integrally coupled to said elongated member such that said leg portion extends outwardly away from said elongated member in a generally horizontal orientation and said foot portion extends downward, said support being positioned generally between said rod and said base plate, a plane extending through a length of said elongated member also extending through said leg and foot portions.

5. The equipment support assembly as in claim 1, further including a support being integrally coupled to said elongated member and positioned generally adjacent to said base plate.

6. An equipment support assembly for mounting equipment in a vehicle, said assembly being removably securable to a floor of a vehicle, said assembly comprising:
   an elongated member having a top end and a bottom end, said elongated member having a curved portion positioned proximal to said top end, said elongated member having a distance from said bottom end to said top end generally between 2 feet and 4 feet;
   a base plate having top side and bottom side, said base plate having a plurality of openings extending therethrough, said bottom side of said base plate being removably securable to the vehicle floor, said bottom end of said elongated member being integrally coupled to said top side of said base plate such that said elongated member is orientated generally vertical when said base plate is secured to said vehicle floor;
   a first mounting plate being integrally coupled to said top end of said elongated member, said first mounting plate being orientated generally horizontal, said first mounting plate having a generally rectangular shape and having a plurality of openings extending therethrough;
   a second mounting plate being integrally coupled to said elongated member, said second mounting plate being positioned generally adjacent to said curved portion and extending away from said curved portion, said second mounting plate being orientated generally horizontal, said second mounting plate having a generally rectangular shape and having a plurality of openings extending therethrough;
   a rod having a first end and second end, said first end of said rod being integrally coupled to said elongated member such that said rod extends outwardly away from said elongated member in a generally horizontal orientation, said rod being positioned generally between said base plate and said second mounting plate, said rod being orientated generally perpendicular to a plane extending through a length of said elongated member;
   a support having a leg portion and foot portion integrally coupled together such that said support generally has an L-shape, said leg portion having a free end integrally coupled to said elongated member such that said leg portion extends outwardly away from said elongated member in a generally horizontal orientation and said foot portion extends downward, said support being positioned generally between said rod and said base plate, said plane generally extending through said leg and foot portions.

7. An equipment support assembly for mounting equipment in a vehicle, said assembly being removably securable to a floor of
   a vehicle, said assembly comprising:
   an elongated member having a top end and a bottom end;
   a base plate having top side and bottom side, said base plate having a plurality of openings extending therethrough, said bottom side of said base plate being removably securable to the vehicle floor, said bottom end of said elongated member being integrally coupled to said top side of said base plate such that said elongated member is orientated generally vertical when said base plate is secured to said vehicle floor;
   a first mounting plate being integrally coupled to said top end of said elongated member, said first mounting plate being orientated generally perpendicular to said elongated member;
   a second mounting plate being integrally coupled to said elongated member, said second mounting plate being positioned generally between said first mounting plate and said base plate, said second mounting plate being orientated generally parallel to said first mounting plate; and a rod having a first end and second end, said first end of said rod being integrally coupled to said elongated member such that said rod extends outwardly away from said elongated member, said rod being positioned generally between said base plate and said second mounting plate.

8. The equipment support assembly as in claim 7, wherein said first mounting plate has a plurality of openings extending therethrough and said second mounting plate has a plurality of openings extending therethrough.

9. The equipment support assembly as in claim 7, wherein said rod extends from said elongate member is a substantially perpendicular relation ship to said elongate member.

10. The equipment support assembly as in claim 7, wherein said elongated member has a curved portion positioned proximal to said top end, said second mounting plate being positioned generally adjacent to said curved portion and extending away from said curved portion.

11. The equipment support assembly as in claim 7, further including a support being integrally coupled to said elongated member and positioned generally adjacent to said base plate.

12. The equipment support assembly as in claim 11, said support has a leg portion and foot portion integrally coupled together such that said support generally has an L-shape, said leg portion having a free end integrally coupled to said elongated member such that said leg portion extends outwardly away from said elongated member in a generally horizontal orientation and said foot portion extends downward, said support being positioned generally between said rod and said base plate, a plane extending through a length of said elongated member also extending through said leg and foot portions.

13. The equipment support assembly as in claim 7, further including a support being integrally coupled to said elongated member and positioned generally adjacent to said base plate.

* * * * *